United States Patent [19]

Baidon et al.

[11] Patent Number: 5,699,348

[45] Date of Patent: Dec. 16, 1997

[54] METHOD AND APPARATUS FOR ERROR PERFORMANCE MONITORING OF A LEASED TELECOMMUNICATION CIRCUIT

[75] Inventors: Sami A. Baidon, New Milford; Shirley L. Huang, Holmdel, both of N.J.

[73] Assignee: Lucent Technologies Inc., Murray Hill, N.J.

[21] Appl. No.: 551,136

[22] Filed: Oct. 31, 1995

[51] Int. Cl.$^6$ ........................................ H04J 3/14
[52] U.S. Cl. ................... 370/242; 370/252; 395/185.01
[58] Field of Search ............................. 370/242, 243, 370/244, 252; 379/10, 24, 26; 395/183.01, 185.01

[56] References Cited

U.S. PATENT DOCUMENTS

| | | |
|---|---|---|
| 4,730,313 | 3/1988 | Stephenson et al. . |
| 5,099,511 | 3/1992 | Matsumoto ............................. 379/198 |
| 5,148,426 | 9/1992 | Shenoi et al. ......................... 370/32.1 |
| 5,166,890 | 11/1992 | Smischny ............................. 364/551.01 |
| 5,233,648 | 8/1993 | Nakamura ............................. 379/233 |
| 5,311,586 | 5/1994 | Bogard et al. ......................... 379/221 |
| 5,327,489 | 7/1994 | Anderson et al. ..................... 379/207 |
| 5,329,520 | 7/1994 | Richardson ........................... 370/16 |
| 5,329,589 | 7/1994 | Fraser et al. ......................... 379/91 |
| 5,343,461 | 8/1994 | Barton et al. ......................... 370/13 |
| 5,400,266 | 3/1995 | Sato et al. ............................. 364/550 |
| 5,450,441 | 9/1995 | Harris et al. .......................... 375/224 |
| 5,513,173 | 4/1996 | Machemer et al. ................... 370/252 |
| 5,528,748 | 6/1996 | Wallace ............................... 395/183.01 |

OTHER PUBLICATIONS

Gerald D. Austin and Hilary B. Tomasson, "Unlocking the Value of Performance Monitoring Data," *Telephony*, Nov. 14, 1994, pp. 49–52.

Primary Examiner—Douglas W. Olms
Assistant Examiner—Min Jung

[57] ABSTRACT

A method and apparatus for use in monitoring and analyzing statistical parameters corresponding to errors occurring in the transmission of data signals in a telecommunications network is disclosed. Communication between two customer sites occurs through the use of a leased line or circuit, which defines fixed paths between the customer terminals and which comprises a plurality of network elements. Statistical parameters, corresponding to errors detected and processed at ports in the network elements, are sent to a central management system which executes a performance monitoring count routine to determine the total number of errored-seconds, or severely-errored-seconds, or other statistical parameters associated with each direction of transmission in the customer circuit.

12 Claims, 5 Drawing Sheets

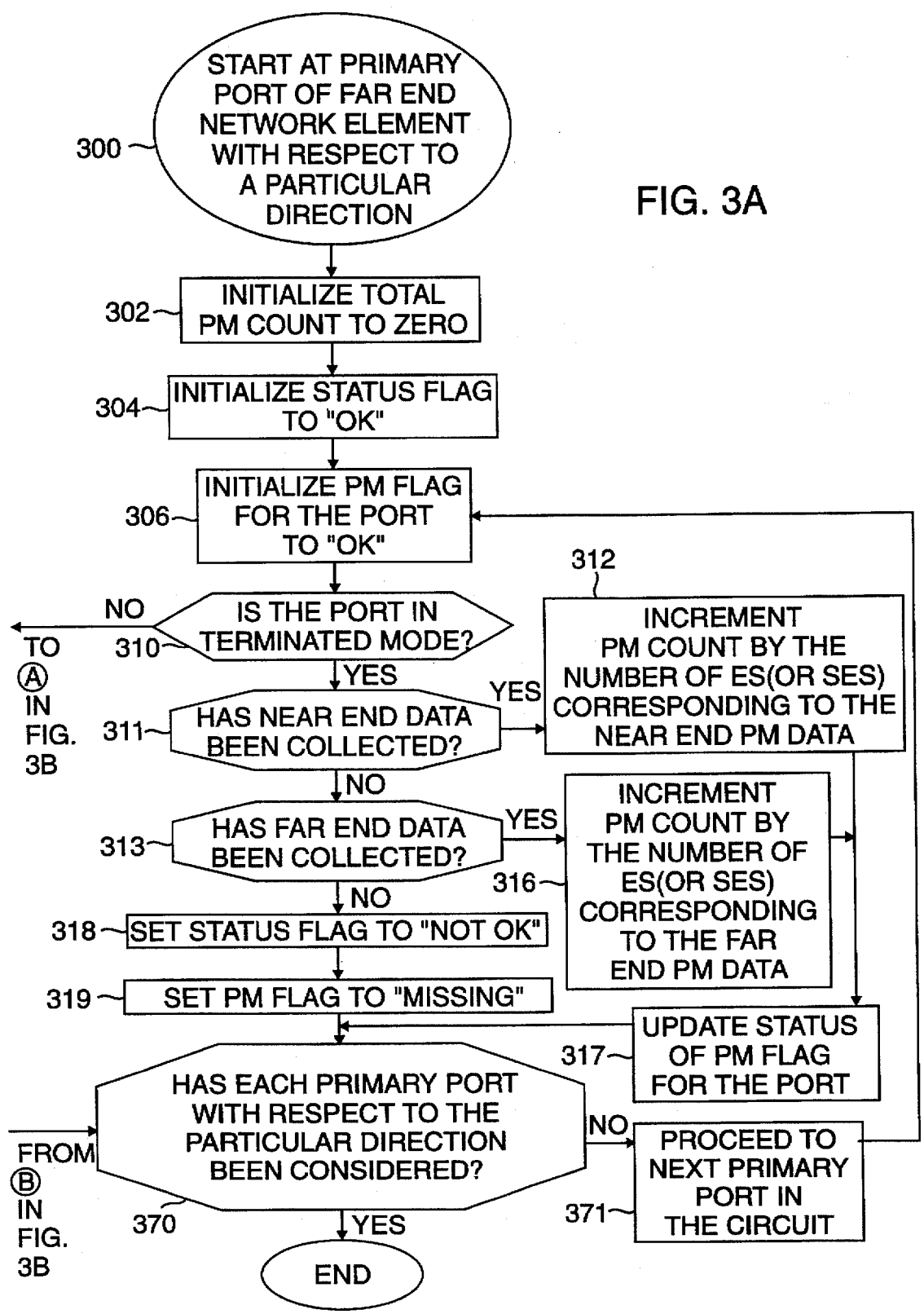

METHOD AND APPARATUS FOR ERROR PERFORMANCE MONITORING OF A LEASED TELECOMMUNICATION CIRCUIT

FIELD OF THE INVENTION

The present invention relates generally to the field of operating systems for digital telecommunications networks. In particular, this invention relates to a method and apparatus for monitoring and determining the number of errored-seconds or severely-errored-seconds of a leased telecommunication line or circuit.

BACKGROUND OF THE INVENTION

Modern digital telecommunications systems and communication media provide high bandwidth over which information can be communicated. The DS-3 data frame standard, for example, provides a data rate of 44.736 Megabits per second (Mbps). These high bandwidths have enabled the communication of large volumes of data at high speeds. A large number of voice channels may now be communicated over a single communication line. Furthermore, the available bandwidth also enables the communication of large blocks of digital data between computers, as well as digital data representative of other media such as video displays.

The successful transmission of digital data among computers, however, requires high reliability and quality transmission. Furthermore, many telecommunications customers pay high premium tariffs for high quality and low error rate communications. Accordingly, conventional digital cross-connects now provide performance monitoring (PM) to ensure a particular level of service desired by telecommunications customers. The telephone industry, for example, has shifted to an error-free-seconds alarm surveillance strategy for digital services. In this strategy, the goal is to provide performance guarantees to customers in terms of error-free seconds, errored-seconds (ES) and severely-errored-seconds (SES), which are defined in International Telecommunication Union (ITU) recommendation G.821. An errored-second is a one-second interval during which one or more bit errors occur. A severely-errored-second is a one-second interval with a bit error ratio greater than or equal to $10^{-3}$. Thus, for example, a customer may be guaranteed by the carrier that it will receive 99.5% error-free seconds, or, in other words, that the communications transmission system will introduce only one error in a period of two hundred seconds.

Present-day digital leased line circuits, however, typically are complex strings of network elements which are connected via multiple transmission media over hundreds or thousands of miles. In addition, the performance objectives guaranteed to customers are generally applicable to each direction of the transmission path. Thus, the end-to-end ES and SES data calculations should be accurate for each direction. Furthermore, it is desirable to have a simple method for determining the total number of ES and SES for each transmission direction in the customer circuit and for providing promptly an alert signal if the number of errors approaches or exceeds the maximum number of errors guaranteed to the customer with respect to the particular telecommunication circuit.

SUMMARY OF THE INVENTION

The present invention relates to a method and apparatus for use in monitoring and analyzing statistical parameters corresponding to errors occurring in the transmission of data signals in a telecommunication system. Communication between two customer sites preferably occurs through the use of a leased line or circuit, which defines fixed paths between the customer terminals and which comprises a plurality of transmission media and a plurality of network elements, including a near end and a far end network element. Each network element preferably comprises a primary and secondary port, each of which functions in one of a plurality of modes, for example, a first mode, a second mode, or a third mode. According to one embodiment, each port is in either a terminated mode, a framed clear mode, or an unframed clear mode. Errors in the transmission of data signals are detected and collected in at least some of the ports each of which preferably processes the data it collects to produce statistical parameters such as errored-seconds or severely-errored-seconds. The statistical parameters are then sent to a central management system which executes a performance monitoring ("PM") count routine to determine the number of errored-seconds, or severely-errored-seconds, associated with each direction of transmission in the customer circuit.

In accordance with the principles of the present invention, the PM count routine is preferably performed with respect to a particular direction of transmission in a telecommunication circuit by beginning at the primary port associated with the far end network element, and proceeding in succession to each primary port defined with respect to the particular direction of transmissions. The PM count routine may be performed separately with respect to errored-seconds, severely-errored-seconds or other statistical parameters.

According to one aspect of the present invention, if a port is in the terminated mode, then a PM count for the particular direction in the customer circuit is incremented according to the statistical parameters corresponding to near end performance data collected at the port. If no near end performance data was collected, then the PM count is incremented according to the statistical parameters corresponding to far end performance data collected at the port.

If a network element is in the framed clear mode, then the PM count is incremented according to the statistical parameters corresponding to the near end performance data collected at the port. In that case, however, the PM count preferably is incremented only if an internal status flag is set to "NOT OK". The status flag is set to "NOT OK", for example, if the previous port considered in the circuit is in the terminated mode, but no near end or far end performance data had been collected and processed. Similarly, the status flag is set to "NOT OK", if the previous port considered is in the unframed clear mode. Finally, the status flag is set to "NOT OK" if the previous port considered is in the framed clear mode, but no near end performance data had been collected and processed.

As described in greater detail below, the PM count routine of the present invention thus provides a count of the errored-seconds or severely-errored-seconds with respect to a particular direction of transmission in the customer circuit. This information can then be displayed on a display screen at a work station where appropriate action can be taken in response to the displayed information.

A more complete understanding of the present invention, as well as other features and advantages of the present invention, may be obtained with reference to the following detailed description and accompanying drawings.

BRIEF DESCRIPTION OF THE DRAWINGS

FIGS. 3A–3B are a flow chart showing the steps of the performance monitoring (PM) count routine in accordance with the present invention.

DETAILED DESCRIPTION

Figure 1:
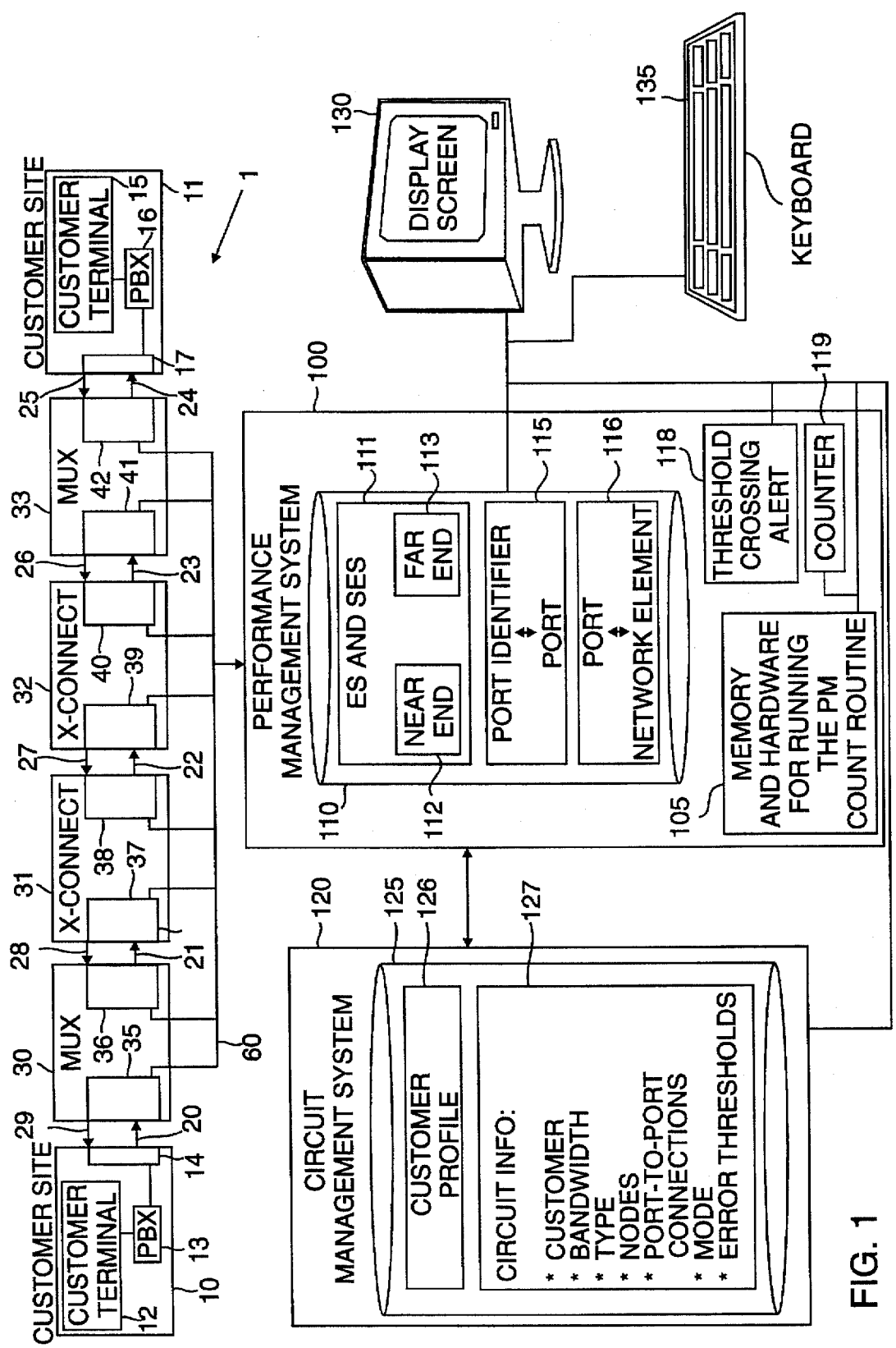
FIG. 1 is a block diagram of an error performance monitoring system for use in accordance with the present invention.

FIG. 1 is a block diagram of an error performance monitoring system 1 for use in monitoring statistical parameters corresponding to errors occurring in the transmission of data signals in a telecommunication system in accordance with the present invention. The system includes at least two customer sites 10, 11 each of which preferably has a respective customer terminal 12, 15 which is used to transmit and receive digital data via a telephone system designed for voice communications but adapted to the transmission of digital data. Each of the terminals 12, 15 suitably may be operatively connected to respective telecommunication ports 14, 17 via respective public branch exchange systems (PBXs) 13, 16. Communication between the two customer sites 10, 11 preferably occurs through the use of a leased line or circuit, which defines fixed paths between the customer terminals and which comprises a plurality of transmission media and a plurality of network elements, such as multiplexer switches or cross-connect switches, as explained further below.

For purposes of illustration, it is assumed that the customer has leased a DS-0 line. The customer may send, for example, digital data from the terminal 12 through a telephone line 20 to a central office facility where a multiplexer 30 multiplexes many channels into one wide-bandwidth channel. By convention, the standard system comprises twenty-four individual DS-0 channels. The multiplexer 30 generates and multiplexes the digital signals, including the DS-0 signal carrying the customer's data, to produce a 1.544 Megabits per second (Mbps), or DS-1, signal. This signal is then transmitted, for example, on a T1 transmission line 21.

The DS-1 signal is eventually sent to a demultiplexer switch 33 via other network elements, such as cross-connect switches 31, 32, and via transmission media, such as T1 transmission lines 22, 23. The demultiplexer switch 33 processes the received T1 signal to produce a DS-0 signal carrying the original data transmitted from the customer terminal 12. The data is then sent to the terminal 15 via a telephone line 24 operatively connected to the port 17 at the customer site 11.

The system 1 is bi-directional, and data may be sent from the terminal 15, via transmission media 25–29, to the terminal 12 in a similar manner as described above. The transmission media 25, 29 may suitably be telephone lines, and the transmission media 26–28 may suitably be T1 transmission lines. Furthermore, the system 1 may also include other types of network elements as well as a different number of network elements. For example, the system 1 may include additional cross-connect switches, or it may include multiplexer switches which combine DS-1 signals to produce a higher level signal, such as a DS-3 signal.

Each of the network elements in the system 1 preferably comprises ports for receiving and transmitting the data and control signals that pass through the network element. In addition, each of the ports preferably includes performance monitoring (PM) circuitry and associated software or firmware.

In the discussion that follows, with respect to the transmissions from the terminal 12 to the terminal 15, the ports 35, 37, 39 and 41 will be designated as primary ports. Similarly, with respect to the transmissions from the terminal 12 to the terminal 15, the ports 36, 38, 40 and 42 will be designated as secondary ports. It should be understood, however, that while the primary ports and secondary ports are shown as distinct and separate ports in FIG. 1, a primary port and a secondary port on a particular network element may be physically embodied in a single port.

Also, in the discussion that follows, with respect to transmissions from the terminal 12 to the terminal 15, the network element 33, which is the network element closest to the receiving terminal 15, will be designated as the far end network element. Similarly, with respect to the transmissions from the terminal 12 to the terminal 15, the network element 30 will be designated as the near end network element.

At least some of the respective network elements preferably detect, collect and process at least near end performance data which reflects the level of performance with respect to the transmission of data signals received by the network element. Performance monitoring of DS-1 signals includes, for example, computing the bit-error rate, framing-bit errors, and slips, and maintaining suitable statistical reports to reflect these parameters. Similarly, performance monitoring of DS-3 signals includes, for example, computing the bit-error rate based upon bipolar violations, out-of-frame events, parity errors, and C-bit errors. Intelligent multiplexers with multiple input and output ports, which detect data errors and collect and process near end PM data and which are commercially available from AT&T Corp., are suitable for use as the multiplexers 30, 33. The statistical parameters that are stored preferably include errored-seconds (ES) and severely-errored-seconds (SES) and are maintained, for example, in fifteen-minute and twenty-four-hour intervals.

In addition, the performance monitoring circuitry in some network elements also may be capable of collecting and processing far end performance data. For example, it will be assumed that the ports 37–40 in the cross-connect switches 31, 32 detect data errors and collect and process far end performance data indicative of the level of performance with respect to the transmission of data signals transmitted from the respective port. Dual digroup cards for use with Digital Access and Cross-Connect System (DACS) network elements, which are commercially available from AT&T Corp., have network processing circuits (NPCs) which collect both near and far end performance data. The statistical parameters kept by the DACS dual digroup cards also include errored-seconds (ES) and severely-errored-seconds (SES). Thus, the cross-connect switches 31, 32 suitably may be implemented, for example, by using DACS network elements and associated dual digroup cards.

In addition, each of the ports 35–42 preferably functions in one of a plurality of modes, such as a first, a second or a third mode. For example, in accordance with ITU recommendation G.821 referred to above, the first mode is a terminated mode, the second mode is a framed clear mode, and the third mode is an unframed clear mode. A port which is in the terminated mode detects data errors, collects and processes PM data, and regenerates the data signal. A port which is in the framed clear, or pass through, mode also accumulates PM data, but does not regenerate the data signal. Finally, a port which is in the unframed clear mode does not collect and process PM data.

Figure 2:
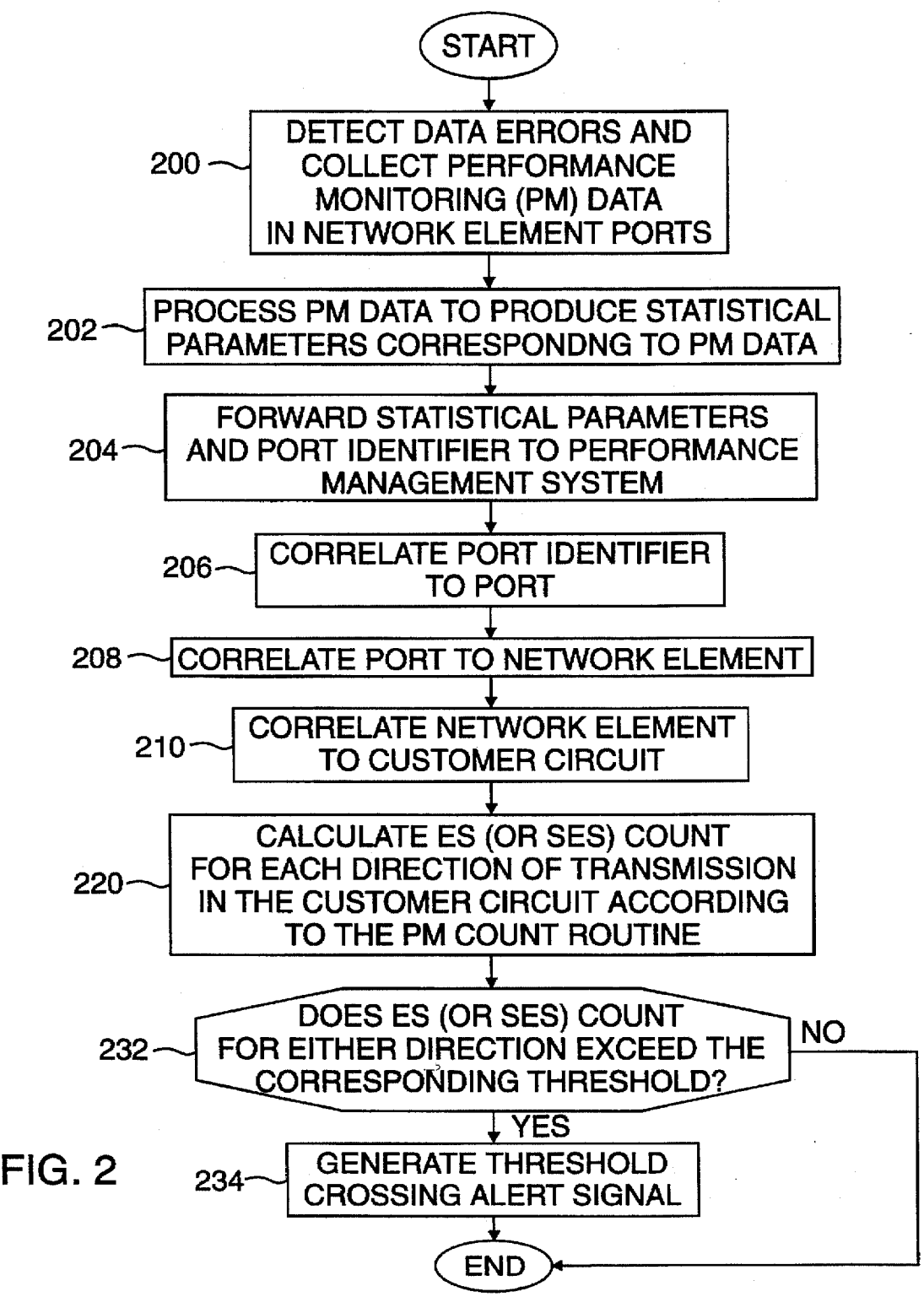
FIG. 2 is a flow chart showing the steps of monitoring and analyzing performance data in accordance with the present invention.
Figure 3B:
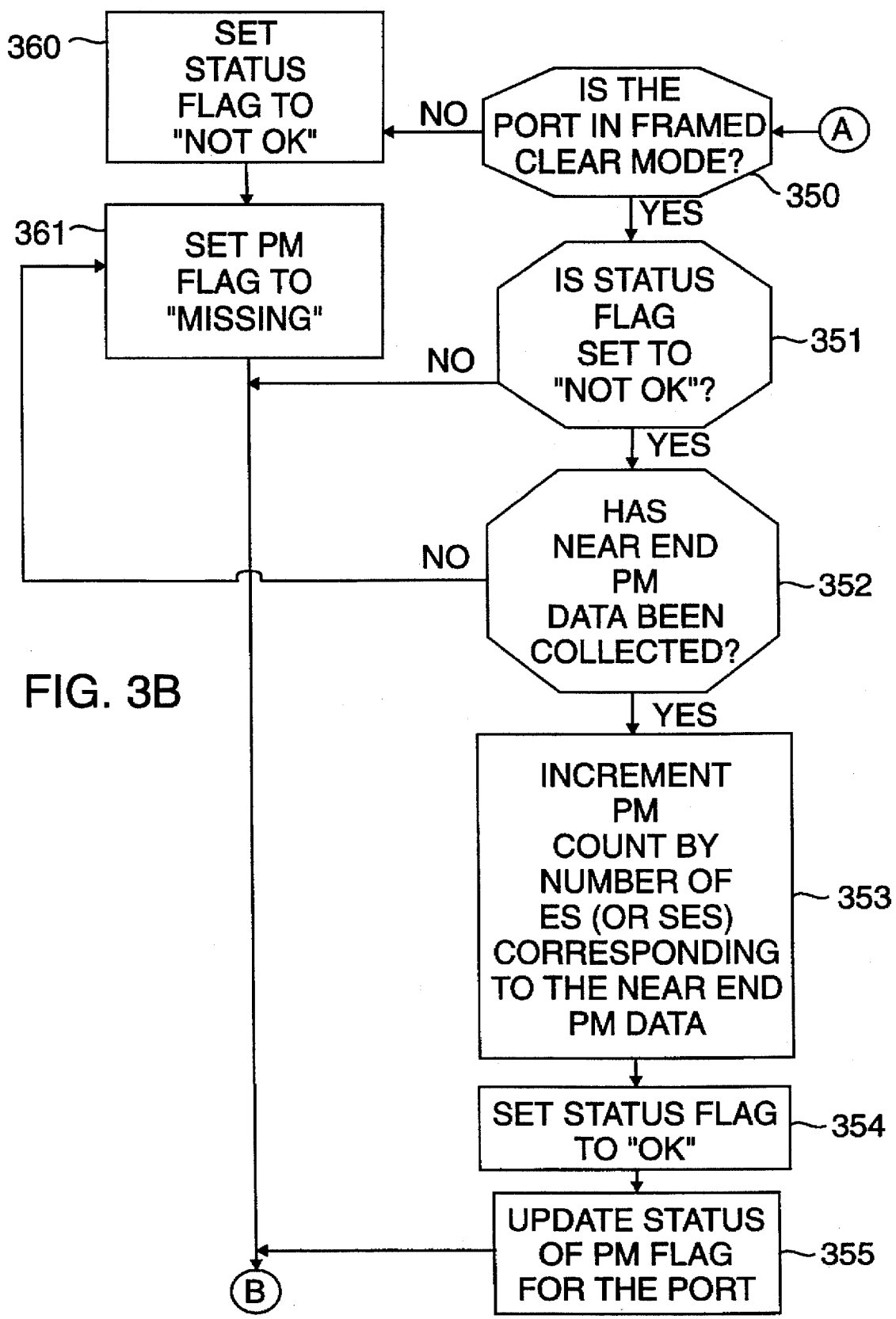
Figure 4:
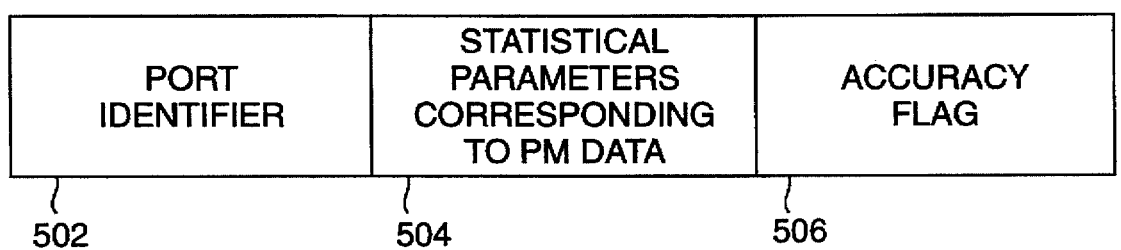
FIG. 4 illustrates an exemplary message sent from one of the ports to the performance management system in accordance with the present invention.

The description of the remaining elements and features of FIG. 1 will be more easily understood in connection with the flow charts in FIGS. 2 and 3A-3B which show the steps of the method of the present invention in greater detail. As indicated by step 200 in FIG. 2, data errors are detected and performance monitoring (PM) data is preferably collected in respective ports of the network elements in the leased customer circuit in the manner explained above. Next, as indicated by step 202, the PM data is processed to produce statistical parameters, such as the number of errored-seconds and severely-errored-seconds. The step of processing 202 preferably is performed at the ports 45-52 of the respective network elements 30-33, as explained above. Then, as shown in step 204, the statistical parameters are forwarded to a performance management system 100. In addition to the statistical parameters, a port identifier, which uniquely identifies the port from which the statistical parameters are being forwarded, is also sent to the performance management system 100. In a preferred embodiment, an accuracy flag is also forwarded to the performance management system 100. Each accuracy flag includes one or more indicators regarding the status of the PM data collected from the particular port, such as whether the PM data is complete. FIG. 4 illustrates an exemplary message 500 sent from one of the ports 35-42 to the performance management system 100. The message 500 includes a segment 502 containing the port identifier, a segment 504 containing the statistical parameters corresponding to the PM data collected in the particular port, and a segment 506 containing the accuracy flag. The statistical parameters and other information in the message 500 suitably may be sent from the respective ports 35-52 to the management system 100 via a local access network (LAN) 60.

The performance management system 100 suitably has appropriately programmed memory and hardware 105 for executing software routines or programs. In particular, the performance management system 100 is programmed to execute a performance monitoring (PM) count routine, discussed further below. As the statistical parameters and other data signals are received by the management system 100, they preferably are stored in a file 111 in a database 110 which may be implemented, for example, in a RAM. More specifically, near end data associated with a particular port is preferably stored in a file 112, and far end data associated with the port is stored in a file 113 so that the near end and far end data for each port may be retrieved when the management system 100 executes the PM count routine. It should be understood, however, that in a real system, either or both of the near end and far end PM data for a particular port may not be sent to the management system due to any one of a variety of malfunctions in the system, for example, in the performance monitoring circuitry and associated firmware or software in the particular port.

The database 110 also preferably includes additional files 115-116 which store, respectively, the correlation between each port identifier and the corresponding port in the system 1, and the correlation between each port and the corresponding network element in the system 1. This information may conveniently be stored, for example, in look-up tables. The management system 100 is programmed to correlate each set of statistical parameters it receives to the specific port and network element to which the statistical parameters correspond by using the information stored in the database 110. Thus, in step 206, the management system 100 correlates the port identifier, that was received with a set of statistical parameters, to the particular port which it identifies. Similarly, in step 208, the management system 100 preferably correlates the port identified in step 206 to the network element with which it is associated.

Next, as indicated in step 210, the circuit management system 120 cooperates with the performance management system 100 to correlate the network element identified in step 208 to the customer circuit or circuits which traverse the particular network element and associated ports. In a presently preferred embodiment, this is done by transferring PM count data from the performance management system 100 to the circuit management system 120 where information pertaining to particular customers, as well as information pertaining to particular customer circuits is stored and where further processing occurs as discussed further below. Alternatively, a performance management system could be designed and programmed to retrieve customer data from an appropriately revised circuit management system, and then perform the required processing itself. Further, the two management systems 100, 120 physically may be the same piece of equipment or different pieces of equipment, and may be implemented, for example, using HP 9000 series operating systems commercially available from the Hewlett Packard Company.

The circuit management system 120 comprises a database 125, which may be implemented, for example, by a RAM. The database includes a file 126 which contains information about each customer profile. The database further includes a file 127 containing information about each customer circuit. The circuit information may include, for example, the name of the customer associated with the circuit, the bandwidth of the circuit, and the type of circuit, for example, whether the circuit is a temporary or permanent one. The circuit information contained in the file 127 also includes the identification of the nodes or network elements of which the circuit is comprised, as well as the port-to-port connections for the circuit. In addition, the file 127 contains an indication as to which of the three modes each port in the circuit is in. The performance management system 100 can retrieve the appropriate circuit information stored in the file 127 to determine, in step 210, which customer circuit or circuits are associated with the collected and received performance data. The file 127 also contains information pertaining to error thresholds for each direction of transmission in the customer circuit. The error thresholds correspond, for example, to maximum numbers of allowable errored-seconds or severely-errored-seconds for each direction of transmission in the particular customer circuit. The customer and the company leasing the circuit would typically agree by contract upon the maximum number of errors permitted.

It should be clear that where a particular customer has leased a DS-0 signal line, for example, part of the circuit that transmits the DS-0 signal may be carried on a higher level transmission medium, such as the T1 signal lines 22, 27 in FIG. 1. Although the PM data collected in the ports 38, 39, for example, corresponds to the DS-1 signal carried by the T1 lines 22, 27, it is assumed that the PM data collected by the ports 38, 39 is associated with each of the customer circuits which traverses those ports.

Once the PM data is collected and correlated by the performance management system 100, the circuit management system 120 calculates the total errored-seconds (ES) and/or the total severely errored-seconds for each direction in the customer circuit under consideration, as indicated by step 220. This calculation is performed according to the PM count routine, as explained below with reference to FIGS. 3A-3B.

In the discussion that follows, the PM count routine is considered with respect to transmissions from the terminal 12 to the terminal 15. In accordance with the principles of the present invention, as indicated by step 300 of FIG. 3A, the PM count routine preferably begins by considering the primary port 41 in the far end network element 33, and then considers each primary port, defined with respect to the specified direction of transmission, in succession.

As indicated by step 302, the PM count is initialized to zero. The PM count reflects the current total number of errored-seconds or severely-errored-seconds detected in the particular direction of transmission in the customer circuit under consideration. The PM count routine is, thus, preferably executed separately with respect to errored-seconds and severely-errored-seconds. The PM count routine may also be applied to other statistical parameters which reflect the number of errors or accuracy of data signals transmitted via network elements in a communication circuit. For illustrative purposes, however, the PM count routine will be described with respect to errored-seconds. The current PM count may be stored, for example, as part of the software routine executed by the performance management system 100. Alternatively, the current PM count may be stored using hardware, such as by incrementing a counter or register 119.

In step 304, a status flag is initialized to "OK". As will become clear from the discussion below, the status flag is used internally during execution of the PM count routine and may take on the two values, "OK" and "NOT OK". In step 306, the status of a PM flag for the primary port under consideration is initialized to "OK". A PM flag is associated with each port in the circuit under consideration and serves the function of indicating the accuracy or completeness of the PM data upon which the statistical parameters are based.

As indicated in step 310, the management system 100 determines whether the port under consideration is in the first, or terminated, mode. If the port is in the terminated mode, then, in step 311, the management system 311 determines whether near end PM data has been collected and processed at that port. If near end PM data has been collected and processed, then, as indicated in step 312, the PM count is incremented by the number of errored-seconds (ES) corresponding to the near end PM data collected at the port. Similarly, when the PM count routine is executed with respect to severely-errored-seconds (SES), the PM count is incremented by the number of severely-errored-seconds (SES) corresponding to the near end PM data collected at the port.

If, with respect to step 311, the management system 100 determines that near end PM data has not been collected and processed for the port under consideration, then, in step 313, the system 100 proceeds to determine whether far end PM data has been collected and processed for that port. If far end PM data has been collected and processed, then, as indicated in step 314, the PM count is incremented by the number of errored-seconds (ES) corresponding to the far end PM data collected at the port. When the PM count is incremented in either step 312 or 314, then, in step 317, the status of the PM flag for the port under consideration is preferably updated to indicate the accuracy or completeness of the PM data upon which the statistical parameters were based. The status of the PM flags will typically be based upon the accuracy flags received from the ports, such as the accuracy flag 506.

If the management system 100 determines that neither near end nor far end PM data has been collected for the port under consideration, then, as indicated in step 318, the internal status flag is set to "NOT OK". Similarly, in step 319, the PM flag for the port under consideration is set to "MISSING" to indicate that statistical parameters corresponding to PM data for this port are missing and were not used in calculating the PM count.

Returning to step 310, if the management system 100 determines that the port under consideration is not in the terminated mode, then, in step 350 of FIG. 3B, the system 100 determines whether the port is in the second, or framed clear, mode. If the port is in the framed clear mode, then, in step 351, the management system 100 determines whether the internal status flag is presently set to "NOT OK". If the status flag is set to "NOT OK", then, in step 352, the system 100 determines whether near end data for the port under consideration has been collected and processed. If near end data has been collected, then, as indicated by step 353, the PM count is incremented by the number of errored-seconds (ES) corresponding to the near end PM data collected at the port. The status flag is also set to "OK", as indicated by step 354. Finally, as indicated in step 355, the status of the PM flag for the port under consideration is preferably updated to indicate the accuracy or completeness of the PM data upon which the statistical parameters were based.

With respect to step 350, if the port is not in the framed clear mode, the internal status flag is set to "NOT OK", as indicated in step 360, and the PM flag for the port is set to "MISSING", as indicated in step 361. Steps 360 and 361 would be executed, for example, if the port were in the unframed clear mode. Similarly, with respect to step 353, if near end PM data has not been collected and processed, then, as indicated by step 361, the PM flag for the port is set to "MISSING".

Once the number of errored-seconds has been added to the PM count, or the PM flag has been set to "MISSING", then, as indicated in step 370, the management system 100 determines whether each of the primary ports, with respect to the particular direction of transmission, has been considered. Similarly, with respect to step 351, if the internal status flag is set to "OK", the management system 100 also proceeds to step 370. If fewer then all of the primary ports have been considered, then, as indicated by step 371, the PM count routine proceeds to the performance monitoring data collected at the next primary port in the circuit. Thus, the PM count routine would proceed to consider the performance monitoring data collected at the port 39 in the cross-connect switch 32. The PM count routine continues by returning to step 306. In general, with respect to a particular direction of transmission, the routine is performed with respect to performance monitoring data collected at each primary port which is closer to the far end network element prior to performing the routine with respect to performance monitoring data collected at primary ports in network elements which are further from the far end network element. The steps 306 through 370 are thus performed for the primary port 37 and then the primary port 35, thereby resulting in a cumulative PM count with respect to transmissions in the specified direction. The cumulative PM count for the particular direction may then be stored in the database 110.

The PM count routine may also be executed with respect to transmissions in the reverse direction, in other words, transmissions from the terminal 15 to the terminal 12. Execution of the PM count routine with respect to the reverse direction of transmissions is accomplished by reversing the designation of the respective ports as primary and secondary ports and by reversing the designation of the respective network elements as the near end and the far network elements. Thus, the PM count routine may be applied to transmissions from the terminal 15 to the terminal 12 by designating the ports 36, 38, 40 and 42 as primary ports and by designating the network element 30 as the far end network element.

The PM count routine described above thus provides a convenient method for calculating the number of errored-seconds or severely-errored-seconds with respect to each direction of transmission in the customer circuit. The resulting number of errored-seconds, or severely-errored-seconds, for a particular direction is preferably compared to the corresponding error threshold stored in the circuit information file 127 in the database 125 to determine, in step 232, whether the actual number of errors exceeds the corresponding threshold. If the number of errored-seconds or severely-errored-seconds for a particular direction of transmission does exceed the corresponding threshold level, then, as indicated by step 234, a threshold crossing alert signal is generated by appropriate software or circuitry 118.

The number of ES or SES for a particular direction of transmission in a customer circuit, as well as any alert signals, are preferably transmitted to a work station comprising a keyboard 135 and a display screen 130. The transmitted information may be displayed on the screen 130 so that a person working at the work station may take appropriate action, such as informing the customer of the daily or monthly performance monitoring results or such as rectifying problems in a circuit for which the actual number of errors exceeds the contractual limit agreed upon with the customer. A person working at the work station may use the keyboard 135, for example, to scroll through information displayed on the screen 130 or to enter or change data stored in the database 125.

Although the present invention has been described with reference to a particular embodiment, it will be readily apparent to persons of ordinary skill in the art that other arrangements and embodiments may be made without departing from the spirit and scope of the invention. The invention is, therefore, limited only by the appended claims.

We claim:

1. A method of analyzing statistical parameters corresponding to performance monitoring data reflecting errors occurring in the transmission of data signals transmitted via a telecommunication circuit comprising a plurality of network elements including a far end network element defined with respect to a particular direction of transmission in the circuit, wherein each of the network elements comprises a primary port defined with respect to said direction of transmission, and wherein each primary port functions in one of a plurality of modes, the method comprising the steps of:

performing the following steps with respect to each of the primary ports:
  (a) incrementing a performance monitoring count according to a statistical parameter corresponding to near end performance monitoring data detected at said port if the port functions in a first mode;
  (b) incrementing the performance monitoring count according to a statistical parameter corresponding to far end performance monitoring data detected at said port if the port functions in the first mode and if near end performance monitoring data was not detected at said port; and
  (c) incrementing the performance monitoring count according to a statistical parameter corresponding to near end performance monitoring data detected at said port if the port functions in a second mode and if:
    (i) the previous port for which steps (a) and (b) were performed functions in the first mode and neither near end nor far end performance monitoring data was detected at the previous port; or
    (ii) the previous port for which steps (a) and (b) were performed functions in a third mode; or
    (iii) the previous port for which steps (a) and (b) were performed functions in the second mode, but no near end performance monitoring data was detected at the previous port.

2. The method of claim 1 wherein the steps (a), (b) and (c) are performed first with respect to performance monitoring data detected at the far end network element and subsequently with respect to performance monitoring data collected at each primary port which is closer to the far end network element prior to performing the steps (a), (b) and (c) with respect to performance monitoring data collected at primary ports which are further from the far end network element.

3. The method of claim 1 wherein the first mode is a terminated mode.

4. The method of claim 1 wherein the second mode is a framed clear mode.

5. The method of claim 1 wherein the third mode is an unframed clear mode.

6. The method of claim 1 wherein the steps (a), (b) and (c) comprise incrementing the performance monitoring count by the number of errored-seconds detected at the port.

7. The method of claim 1 wherein the steps (a), (b) and (c) comprise incrementing the performance monitoring count by the number of severely-errored-seconds detected at the port.

8. The method of claim 1 further comprising the step of comparing the performance monitoring count to a stored threshold value.

9. The method of claim 8 further comprising the step of providing an alert signal if the performance monitoring count exceeds said threshold value.

10. An apparatus for analyzing statistical parameters corresponding to performance monitoring data reflecting errors occurring in the transmission of data signals transmitted via a telecommunication circuit comprising a plurality of network elements including a far end network element defined with respect to a particular direction of transmission in the circuit, the apparatus comprising:

a primary port in each of the network elements, wherein the primary ports are defined with respect to said direction of transmission and wherein at least some of the primary ports comprise means for detecting near end or far end performance monitoring data;

means for processing the detected performance monitoring data to produce corresponding statistical parameters; and a counter which is incremented according to the statistical parameters, commencing first with the statistical parameters corresponding to performance monitoring data detected at the primary port in said far end network element and proceeding, in succession, to the statistical parameters corresponding to performance monitoring data detected at each primary port which is closer to the far end network element prior to primary ports which are further from the far end network element.

11. The apparatus of claim 10 wherein the counter is incremented according to a statistical parameter corresponding to near end performance monitoring data detected at one of the ports if the port functions in a terminated mode, and wherein the counter is incremented according to a statistical parameter corresponding to far end performance monitoring data detected at said port if the port functions in the terminated mode and if near end performance monitoring data was not detected at said port.

12. The apparatus of claim 11 wherein the counter is incremented according to a statistical parameter corresponding to near end performance monitoring data detected at said port if the port functions in a framed clear mode and if:

(i) the previous port, with respect to which the counter was incremented, functions in the terminated mode, and neither near end nor far end performance monitoring data was detected at the previous port; or (ii) the previous port, with respect to which the counter was incremented, functions in an unframed clear mode; or (iii) the previous port, with respect to which the counter was incremented, functions in the framed clear mode, but no near end performance monitoring data was detected at the previous port.

* * * * *